(12) United States Patent
Hirose (10) Patent No.: US 10,281,706 B2
(45) Date of Patent: May 7, 2019

(54) OBSERVATION OPTICAL SYSTEM

(71) Applicant: Konica Minolta, Inc., Tokyo (JP)

(72) Inventor: Naoki Hirose, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 117 days.

(21) Appl. No.: 15/650,061

(22) Filed: Jul. 14, 2017

(65) Prior Publication Data

US 2018/0017775 A1    Jan. 18, 2018

(30) Foreign Application Priority Data

Jul. 15, 2016  (JP) ................................ 2016-140058

(51) Int. Cl.
| | |
|---|---|
| *G02B 15/163* | (2006.01) |
| *G02B 21/20* | (2006.01) |
| *G02B 21/00* | (2006.01) |
| *G02B 7/00* | (2006.01) |
| *G02B 7/18* | (2006.01) |
| *G02B 23/00* | (2006.01) |

(52) U.S. Cl.
CPC ............. *G02B 21/20* (2013.01); *G02B 7/002* (2013.01); *G02B 7/1805* (2013.01); *G02B 15/163* (2013.01); *G02B 21/0012* (2013.01); *G02B 23/00* (2013.01)

(58) Field of Classification Search
None
See application file for complete search history.

(56) References Cited

U.S. PATENT DOCUMENTS

| | | | | |
|---|---|---|---|---|
| 5,576,888 A | * | 11/1996 | Betensky | ............... G02B 15/14 359/375 |
| 6,094,310 A | * | 7/2000 | Hankawa | ............. G02B 25/001 359/643 |
| 6,577,449 B1 | * | 6/2003 | Kanai | .................. G02B 15/163 359/421 |
| 9,709,780 B2 | * | 7/2017 | Jin | ........................ G02B 25/001 |
| 9,869,850 B2 | * | 1/2018 | Jin | ........................ G02B 25/001 |
| 2004/0095642 A1 | * | 5/2004 | Watanabe | ............... G02B 7/06 359/407 |

FOREIGN PATENT DOCUMENTS

| | | |
|---|---|---|
| JP | H10-10440 A | 1/1998 |
| JP | 2001-174716 A | 6/2001 |

* cited by examiner

*Primary Examiner* — Derek S. Chapel
(74) *Attorney, Agent, or Firm* — Osha Liang LLP (57) ABSTRACT

An observation optical system has an objective system and an eyepiece system in the order from the object side. The objective system includes, in the order from the object side, a first group having a positive power, a second group having a positive power, and a third group having a negative power. The objective system has an inverting optical system. The eyepiece system includes, in the order from the object side, a fourth group having a positive power and a fifth group having a positive power. The third group and the fourth group move in directions separating from each other along an optical axis to thereby perform variable power from a low magnification to a high magnification, and also the following conditional expression is satisfied:

$$0.28 < H \times L/f \leq 0.55 \qquad (1).$$

5 Claims, 9 Drawing Sheets

OBSERVATION OPTICAL SYSTEM

CROSS REFERENCE TO RELATED APPLICATIONS

Japan Patent Application No. 2016-140058 filed on Jul. 15, 2016, including description, claims, drawings, and abstract the entire disclosure is incorporated herein by reference in its entirety.

TECHNOLOGICAL FIELD

One or more embodiments of the present invention relate to an observation optical system with a variable power function, and relate to a variable-power type observation optical system usable for medical loupes, loupes for manual work, binoculars, telescopes, or the like, for example.

BACKGROUND

Conventionally, a so-called Kepler type observation optical system has been generally in practical use, which performs primary imaging of an object image to be an erect image via an objective optical system and an inverting optical system, and makes the image observable by an eyepiece system. For example, a finder optical system disclosed in Japanese Patent Laid-Open No. 10-10440 (Patent Literature 1) is mainly characterized in that it appropriately sets the distance between a primary imaging surface of an observed image and a lens provided at its pupil side. In addition, a finder optical system disclosed in Japanese Patent Laid-Open No. 2001-174716 (Patent Literature 2) is mainly characterized in that it secures the distance from an image formation position of an observed image to an optical component at the object side facing thereto, and the distance to an optical component at the pupil side to be equal to or larger than a predetermined distance. Both optical systems are intended to prevent an observer from recognizing dirt or scratches, if any, sticking to or formed on a lens or an optical component near the imaging position, by avoiding focusing on the dirt or the like on the optical surface.

However, only putting dirt or the like sticking to the optical surface out of focus by providing the optical surface outside a predetermined diopter range as described in Patent Literature 1 or 2 may be insufficient to prevent the dirt or the like from being recognized. For example, a larger ratio of the size of dirt sticking to the optical surface relative to the beam diameter may result in a shadowed observed image due to eclipse of the light beam or a lower contrast. Such a state may also be recognized by the observer, which does not provide an appropriate product quality.

CITATION LIST

Patent Literature

[Patent Literature 1] Japanese Patent Laid-Open No. 10-10440

[Patent Literature 2] Japanese Patent Laid-Open No. 2001-174716

SUMMARY

One or more embodiments of the present invention may provide an observation optical system with a good optical performance which handles issues such as dirt and scratches on the lens surface, including the drop of contrast, while securing a moving space for a zoom moving group.

An observation optical system reflecting an aspect of one or more embodiments of the present invention is a real-image type observation optical system having an objective system including an inverting optical system that inverts an inverted image to an erect image, and an eyepiece system provided for observing the erect image formed by the objective system, wherein the objective system essentially includes, in the order from an object side, a first group having a positive power, a second group having a positive power, and a third group having a negative power; the eyepiece system essentially includes, in the order from the object side, a fourth group having a positive power and a fifth group having a positive power; the inverting optical system is located between the first group and the second group; the third group and the fourth group move in directions separating from each other along an optical axis to thereby perform variable power from a low magnification to a high magnification; and the following conditional expression is satisfied:

$$0.28 < H \times L/f \leq 0.55 \quad (1)$$

where, the value H is a pupil diameter at a time of low magnification, the values L are a distance along the optical axis between a real image surface and an optical surface of the third group and a distance along the optical axis between a real image surface and an optical surface of the fourth group facing the real image surface at the time of low magnification, and the value f is a focal distance of the eyepiece system at the time of low magnification. The unit of the values H, L, and f is mm. In the foregoing, the real image surface corresponds to an intermediate imaging point where an image is formed as an erect image by the inverting optical system.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Hereinafter, embodiments of the present invention will be described with reference to the drawings. However, the scope of the invention is not limited to these embodiments.

Hereinafter, there will be described an observation optical system 10, representing one or more embodiments of the present invention, referring to FIG. 1. Note that the observation optical system 10 illustrated in FIG. 1 has the same configuration as that of an observation optical system 10A of Example 1 described below.

Figure 1:
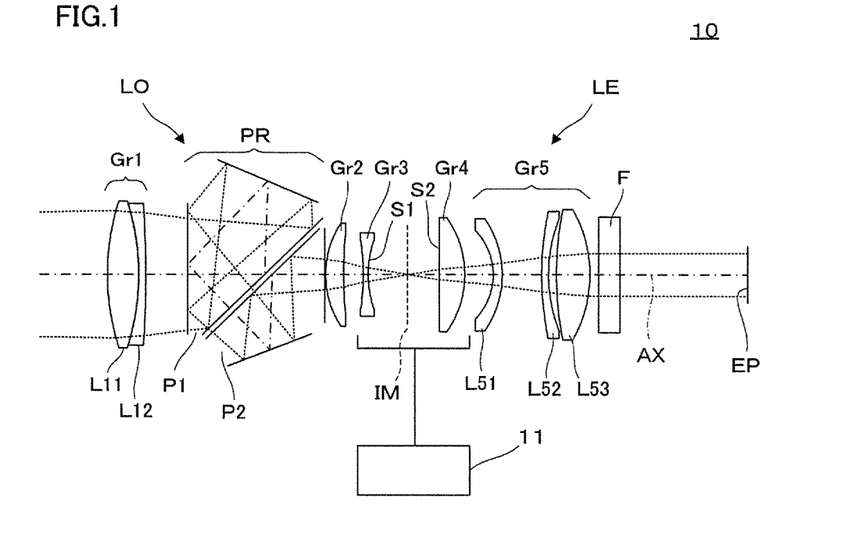
FIG. 1 is a sectional view for explaining an observation optical system of one or more embodiments according to the present invention.

As illustrated in FIG. 1, the observation optical system 10 is a real-image type and variable power type optical system having an objective system LO and an eyepiece system LE in the order from the object side. The observation optical system 10 is fixed to an unillustrated lens barrel or the like, and is used for loupes for medical care, loupes for manual work, binoculars, telescopes, or the like. When applied to a loupe, the observation optical system 10 may be of a spectacle-type or head-wearing type so as to allow manual work to be performed with both hands.

The objective system LO of the observation optical system 10 collects light beams to form a real image. The objective system LO includes, in the order from the object side, a first group Gr1 having a positive power, a second group Gr2 having a positive power, and a third group Gr3 having a negative power. The objective system LO has an inverting optical system PR between the first group Gr1 and the second group Gr2. The inverting optical system PR erects an inverted image that is formed by the objective system LO. The objective system LO has a positive power as a whole.

The first group Gr1 includes a first lens L11 having a positive power and a second lens L12 having a negative power. The first and second lenses L11 and L12 are joined to each other. The first and second lenses L11 and L12 are spherical lenses made of glass.

A prism or prisms, for example, are used for the inverting optical system PR. In the example of FIG. 1, the inverting optical system PR includes two glass prisms P1 and P2.

The second group Gr2 including a single positive lens is provided in proximity to an emitting surface of the inverting optical system PR. The second group Gr2 is a spherical lens made of glass.

The third group Gr3 includes a single negative lens. The third group Gr3 is a zoom moving group which moves along an optical axis AX at the time of variable power, and particularly moves toward the object side when the observation optical system 10 is changed from a low magnification to a high magnification. The lens of the third group Gr3 is a spherical lens made of glass. Note that the third group Gr3 includes a single lens, thus allowing simplification of the holding form, the structure of movement mechanism, or the like, which is effective for weight reduction. In addition, the space in the optical axis AX direction is not used more than necessary, which may contribute to reduction of the optical total length.

The eyepiece system LE allows a human eye to observe, via the pupil EP, the erect image formed on a real image surface IM via the inverting optical system PR. The eyepiece system LE has, in the order from the object side, a fourth group Gr4 having a positive power and a fifth group Gr5 having a positive power. The eyepiece system LE has a positive power as a whole.

The fourth group Gr4 includes a single positive lens. The fourth group Gr4 is a zoom moving group which moves along the optical axis AX at the time of variable power, and particularly moves toward the side at which the pupil EP is located (pupil side) when the observation optical system 10 is changed from a low magnification to a high magnification. Note that the fourth group Gr4 includes a single lens, thus allowing simplification of the holding form, the structure of movement mechanism, or the like, which is effective for weight reduction. In addition, the space in the optical axis AX direction is not used more than necessary, which may contribute to reduction of the optical total length.

The fifth group Gr5, although including a plurality of positive lenses, negative lenses and the like, has a positive power as a whole. The fifth group Gr5, in the illustrated example, includes a first lens L51 having a negative power, a second lens L52 having a negative power, and a third lens L53 having a positive power. In particular, the first lens L51 is a negative meniscus lens whose object-side surface is concave toward the object side. The first to third lenses L51 to L53 are spherical lenses made of glass.

The observation optical system 10 has a link mechanism 11 such as a cam mechanism or the like in order to coordinate the third group Gr3 with the fourth group Gr4 in performing variable power. Accordingly, the third group Gr3 moves toward the object side, i.e., the second group Gr2 side in change from a low magnification to a high magnification and, in accordance therewith, the fourth group Gr4 moves toward the pupil side, i.e., the fifth group Gr5 side so that the two groups Gr3 and Gr4 separate from each other. In addition, in change from a high magnification to a low magnification, the third group Gr3 moves toward the pupil side, i.e., the fourth group Gr4 side and, in accordance therewith, the fourth group Gr4 moves toward the object side, i.e., the third group Gr3 side so that the two groups Gr3 and Gr4 move closer to each other.

In the observation optical system 10, a parallel flat plate F is provided between the eyepiece system LE and the pupil EP. The parallel flat plate F may be a lens for diopter adjustment when the observation optical system 10 is of a spectacle type. Note that, in a case where the observation optical system 10 is used for an application that requires wavelength selection, the parallel flat plate F may have a coating applied thereon for the wavelength selection.

The observation optical system 10 satisfies the following conditional expression:

$$0.28 < H \times L/f \leq 0.55 \tag{1}$$

where the value H is the pupil diameter (diameter of the beam incident in the eye) at the time of low magnification, the values L are the distance along the optical axis AX between the real image surface IM corresponding to an intermediate imaging point and the optical surface S1 of the third group Gr3 and the distance along the optical axis AX between the real image surface IM and the optical surface S2 of fourth group Gr4 facing the real image surface IM at the time of low magnification, and the value f is the focal distance of the eyepiece system LE at the time of low magnification. The unit of the values H, L, and f is mm.

Satisfying the aforementioned conditional expression (1) makes it possible to appropriately set the interval between the third group Gr3 and the real image surface IM as well as the interval between the real image surface IM and the fourth group Gr4 at the time of low magnification, in terms of reducing the total length while preventing contrast drop due to dirt or the like, taking also the pupil diameter or the like into account. Note that, with La being the distance along the optical axis AX from the real image surface IM corresponding to the intermediate imaging point to an optical surface S1 at the object side, and Lb being the distance along the optical axis AX from the real image surface IM to an optical surface S2 at the pupil side, both the distances La and Lb are required to satisfy the conditional expression (1). The value H×L/f of the conditional expression (1) exceeding the lower limit may prevent excessive reduction of the interval between the real image surface IM and the third group Gr3 or the fourth group Gr4, and may suppress phenomena such as appearance of a shadow on a part of the observed image or drop of contrast due to a growing ratio against the beam diameter occupied by dirt or scratches sticking to or formed on the optical surfaces S1 and S2, which are the lens surfaces. On the other hand, falling below the upper limit of the conditional expression (1) may prevent excessive lengthening of the distance between the real image surface IM and respective groups, which turns out to be advantageous for reducing the total length of the optical system. Note that the value H×L/f of the conditional expression (1) is a value corresponding to the light beam diameter on the optical surfaces S1 and S2, and the size of the area occupied by such a light beam turns out to be important in terms of keeping a fairly high contrast even when a light beam contributing to formation or observation of an erect image is obstructed by dirt or the like sticking to the optical surfaces S1 and S2. In other words, it may be said that an excessively small value H×L/f results in a significant drop of contrast due to dirt or the like, and a larger value H×L/f may suppress drop of contrast. Here, it is assumed that the diameter of dirt is around 0.05 mm.

The observation optical system 10 satisfies the following conditional expression.

$$L/f^2 \times 1000 > 4 \quad (2)$$

The aforementioned conditional expression (2) is an additional design requirement for making dirt or scratches sticking to or formed on the optical surfaces S1 and S2, which are the lens surfaces, less conspicuous. The conditional expression (2) defines the distance between the lens of the third group Gr3 located closest to the pupil side or the image side (in the present embodiment, the third group Gr3 includes a single lens, which turns out to be the lens located closest to the pupil side) and the real image surface IM, and the distance between the lens of the fourth group located closest to the object side or the image side (in the present embodiment, the fourth group Gr4 includes a single lens, which turns out to the lens located closest to the object side) and the real image surface IM, also taking into account the focal distance of the eyepiece system LE as well. The value $L/f^2 \times 1000$ of the conditional expression (2) exceeding the lower limit may reduce the possibility of the observer's focusing on dirt or the like sticking to the optical surfaces S1 and S2, which are the lens surfaces facing the real image surface IM, and there may be provided an optical system preferred in terms of quality assurance at the time of manufacturing or after start of use.

A negative meniscus lens (that is, the first lens L51) of the fifth group Gr5 located closest to the object side satisfies the following conditional expression:

$$4.4 < (R1b+R1a)/(R1b-R1a) < 6.0 \quad (3)$$

where the value R1a is the object-side curvature radius of the lens of the fifth group Gr5 located closest to the object side, that is, the first lens L51, and the value R1b is the pupil-side curvature radius of the first lens L51 of the fifth group Gr5 located closest to the object side.

The aforementioned conditional expression (3) defines the shape of the first lens L51 of the fifth group Gr5 located closest to the object side. The value (R1b+R1a)/(R1b−R1a) of the conditional expression (3) exceeding the lower limit may prevent the power of the first lens L51 of the fifth group Gr5 located closest to the object side from becoming excessively strong, and may suppress the phenomenon that the meridional image surface at the time of high magnification degrades and it becomes difficult to correct astigmatism or chromatic coma. On the other hand, falling below the upper limit of the conditional expression (3) may suppress weakening of the power of the first lens L51 of the fifth group Gr5 located closest to the object side that enlarges the lens diameter of the entire fifth group Gr5, which makes it easier to achieve downsizing and weight saving. In addition, falling below the upper limit of the conditional expression (3) may avoid reduction of the Z-value of the first lens L51 that makes it difficult to keep good eccentricity precision, and may prevent degradation of image quality around the field of vision.

In the observation optical system 10 capable of variable power, there may occur a diopter difference between at the time of low magnification and at the time of high magnification due to various manufacturing errors. In other words, it is conceivable in a variable power type optical system that, when an observer observing at a low magnification switches to a high magnification side, or vice versa, the degree of focal shift may exceed a tolerable range. As a means for correcting the diopter difference in such a case, an adjustment that moves the first group Gr1 alone along the optical axis AX may suppress occurrence of focal shift due to switching between a low magnification and a high magnification. Alternatively, an adjustment that moves the inverting optical system PR and the second group Gr2 integrally along the optical axis AX may also suppress occurrence of focal shift due to switching between a low magnification and a high magnification. Note that it is also possible to suppress the amount of shift of the first group Gr1 or the like and reduce the variation of the total length by moving the first group Gr1 alone toward the object side, and also moving the inverting optical system PR and the second group Gr2 integrally toward the pupil side. Similarly, when shifting the first group Gr1 toward the pupil side, the amount of shift of the first group Gr1 may be suppressed by moving the inverting optical system PR or the like toward the object side.

EXAMPLES

Hereinafter, there will be described Examples of the observation optical system according to one or more embodiments of the present invention. Symbols used in respective Examples are given as follows.

R: paraxial curvature radius
D: on-axis surface interval
Nd: refractive index relative to d-line of lens material
vd: Abbe number of lens material
Aside from the foregoing, a symbol "Surf.N" indicates the aspect number, a symbol "INF" indicates infinity or ∞, a symbol "IM" indicates the intermediate real image surface, and a symbol "EP" indicates the pupil.

Example 1

Optical data values of the observation optical system of Example 1 are listed in Table 1 below. Here, the field of vision range is an observable range on an object surface when peeking into the observation optical system from the pupil side.

TABLE 1

|  | low magnification | high magnification |
| --- | --- | --- |
| magnification | 2.5 | 3.4 |
| diopter (dpt) | −1.0 | −1.0 |
| object distance (mm) | 387.9 | 387.9 |
| field of vision range (mm) | φ 90 | φ 80 |
| pupil diameter H (mm) | 5.4 | 4.1 |

Data of lens surface or the like of the observation optical system of Example 1 are listed in Table 2 below.

TABLE 2

| Surf. N | R (mm) | D (mm) | Nd | vd |
| --- | --- | --- | --- | --- |
| 1 | 25.372 | 3.80 | 1.58913 | 61.25 |
| 2 | −20.630 | 0.70 | 1.80610 | 33.27 |
| 3 | −63.832 | 2.53 | | |
| 4 | INF | 32.471 | 1.72825 | 28.32 |
| 5 | INF | 0.50 | | |
| 6 | INF | 16.83 | 1.72825 | 28.32 |
| 7 | INF | 0.14 | | |
| 8 | 11.904 | 1.70 | 1.80610 | 40.73 |
| 9 | 46.038 | d9 (variable) | | |
| 10 | −14.495 | 0.42 | 1.51680 | 64.2 |
| 11 | 12.205 | d11 (variable) | | |
| 12 (IM) | INF | d12 (variable) | | |
| 13 | −104.098 | 3.50 | 1.84666 | 23.78 |
| 14 | −8.528 | d14 (variable) | | |
| 15 | −6.122 | 0.45 | 1.80518 | 25.46 |
| 16 | −8.673 | 3.74 | | |
| 17 | 22.675 | 0.65 | 1.69895 | 30.05 |
| 18 | 12.911 | 1.98 | | |
| 19 | 26.126 | 4.00 | 1.77250 | 49.62 |
| 20 | −14.190 | 1.00 | | |
| 21 | INF | 2.00 | 1.51680 | 64.2 |
| 22 | INF | 12.00 | | |
| 23 (EP) | | | | |

Table 3 below provides an operative example of variable surface intervals d9, d11, d12, and d14 of Table 2, indicating the positions of the third group and the fourth group at the time of low magnification and at the time of high magnification in the observation optical system.

TABLE 3

|  | low magnification | high magnification |
| --- | --- | --- |
| d9 | 4.617 | 2.511 |
| d11 | 0.800 | 3.840 |
| d12 | 1.300 | 1.820 |
| d14 | 3.820 | 2.364 |

Figure 2A:
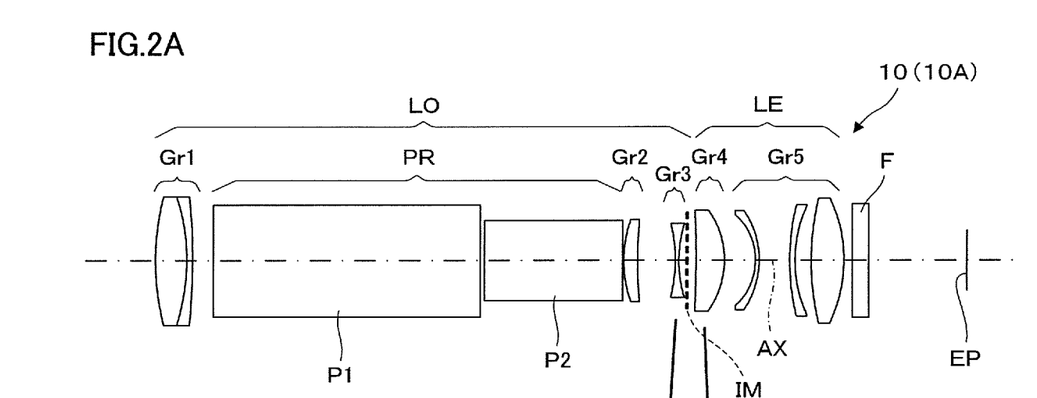
FIG. 2A is a sectional view illustrating an observation optical system of Example 1 at the time of low magnification.
Figure 2B:
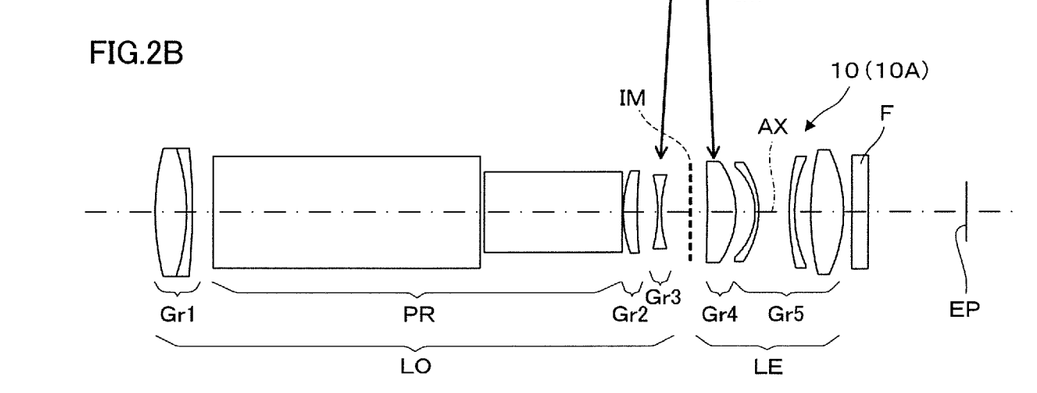
FIG. 2B is a sectional view illustrating the observation optical system of Example 1 at the time of high magnification.

FIG. 2A is a sectional view of the observation optical system 10A of Example 1 at the time of low magnification, and FIG. 2B is a sectional view of the observation optical system 10A at the time of high magnification. The observation optical system 10A of Example 1 has the objective system LO and the eyepiece system LE. The objective system LO includes, in the order from the object side, the first group Gr1 having a positive power, the inverting optical system PR, the second group Gr2 having a positive power, and the third group Gr3 having a negative power. The eyepiece system LE includes, in the order from the object side, the fourth group Gr4 having a positive power and the fifth group Gr5 including three lenses and having a positive power. The lenses included in the first to fifth groups Gr1 to Gr5 are made of glass. The third group Gr3 and the fourth group Gr4 move in a direction separating from each other along the optical axis AX to thereby achieve variation power from a low magnification to a high magnification. Note that, although the symbol F indicates a parallel flat plate, it may be a lens for diopter adjustment in a case where the observation optical system 10A is of a spectacle type. In addition, the line indicated by the symbol EP denotes the designed pupil position (the same goes for the following Examples).

Figure 3A:
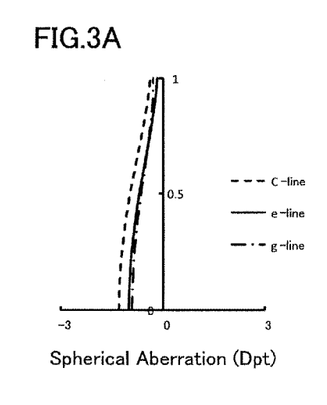
FIGS. 3A to 3C are aberration diagrams of the observation optical system at the time of low magnification as illustrated in FIG. 2A, and FIGS. 3D to 3F are aberration diagrams of the observation optical system at the time of high magnification as illustrated in FIG. 2B.
Figure 3B:
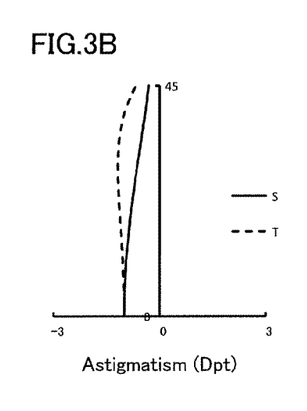
Figure 3C:
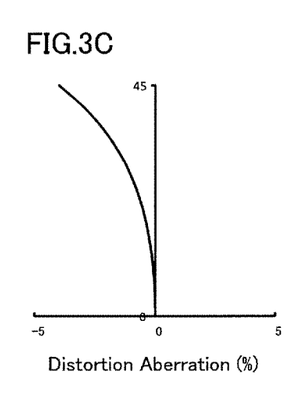

FIGS. 3A to 3C respectively illustrate spherical aberration, astigmatism, and distortion aberration relating to a virtual image observed via the observation optical system 10A at the time of low magnification as illustrated in FIG. 2A. Note that the horizontal axes in the spherical aberration diagram and the astigmatism diagram represent the diopter, with −1 (diopter) being the standard diopter. In addition, the vertical axis in the spherical aberration diagram represents the incident pupil diameter, and the vertical axes in the astigmatism diagram and the distortion aberration diagram represent the field of vision (the same goes for the following case of high magnification or Example 2 and subsequent Examples).

Figure 3D:
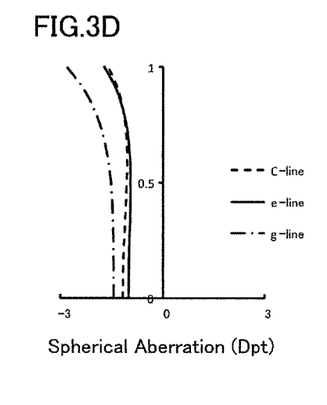
Figure 3E:
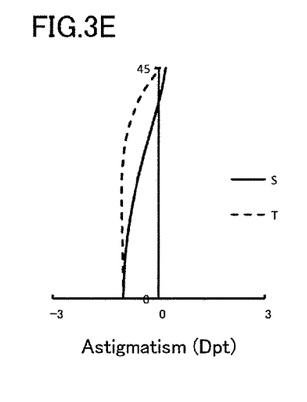
Figure 3F:
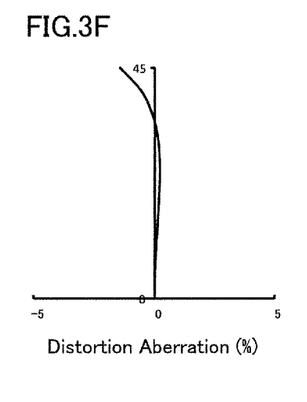

FIGS. 3D to 3F respectively illustrate spherical aberration, astigmatism, and distortion aberration relating to a virtual image observed via the observation optical system 10A at the time of high magnification as illustrated in FIG. 2B.

Example 2

Optical data values of the observation optical system of Example 2 are listed in Table 4 below.

TABLE 4

|  | low magnification | high magnification |
| --- | --- | --- |
| magnification | 2.5 | 3.4 |
| diopter (dpt) | −1.0 | −1.0 |
| object distance (mm) | 387.9 | 387.9 |
| field of vision range (mm) | φ 90 | φ 80 |
| pupil diameter H (mm) | 5.3 | 4.0 |

Data of lens surface or the like of the observation optical system of Example 2 are listed in Table 5 below.

TABLE 5

| Surf. N | R (mm) | D (mm) | Nd | vd |
| --- | --- | --- | --- | --- |
| 1 | 30.404 | 3.46 | 1.58913 | 61.25 |
| 2 | −18.746 | 0.67 | 1.80610 | 33.27 |
| 3 | −46.010 | 3.90 | | |
| 4 | INF | 32.591 | 1.72825 | 28.32 |

TABLE 5-continued

| Surf. N | R (mm) | D (mm) | Nd | vd |
|---|---|---|---|---|
| 5 | INF | 0.50 | | |
| 6 | INF | 16.83 | 1.72825 | 28.32 |
| 7 | INF | 0.10 | | |
| 8 | 13.175 | 1.70 | 1.90366 | 31.32 |
| 9 | 80.252 | d9 (variable) | | |
| 10 | −25.299 | 0.42 | 1.77250 | 49.62 |
| 11 | 15.776 | d11 (variable) | | |
| 12 (IM) | INF | d12 (variable) | | |
| 13 | −34.742 | 3.50 | 1.84666 | 23.78 |
| 14 | −7.819 | d14 (variable) | | |
| 15 | −6.192 | 0.85 | 1.80610 | 33.27 |
| 16 | −9.093 | 3.74 | | |
| 17 | 30.271 | 0.65 | 1.83400 | 37.34 |
| 18 | 13.969 | 1.61 | | |
| 19 | 25.162 | 3.40 | 1.80420 | 46.50 |
| 20 | −14.255 | 0.86 | | |
| 21 | INF | 2.00 | 1.5168 | 64.2 |
| 22 | INF | 12.00 | | |
| 23 (EP) | | | | |

Table 6 below provides an operative example of variable surface intervals d9, d11, d12, and d14 of Table 5, indicating the positions of the third group and the fourth group at the time of low magnification and at the time of high magnification in the observation optical system.

TABLE 6

| | low magnification | high magnification |
|---|---|---|
| d9 | 4.307 | 2.171 |
| d11 | 0.740 | 3.800 |
| d12 | 1.260 | 1.769 |
| d14 | 3.967 | 2.533 |

Figure 4A:
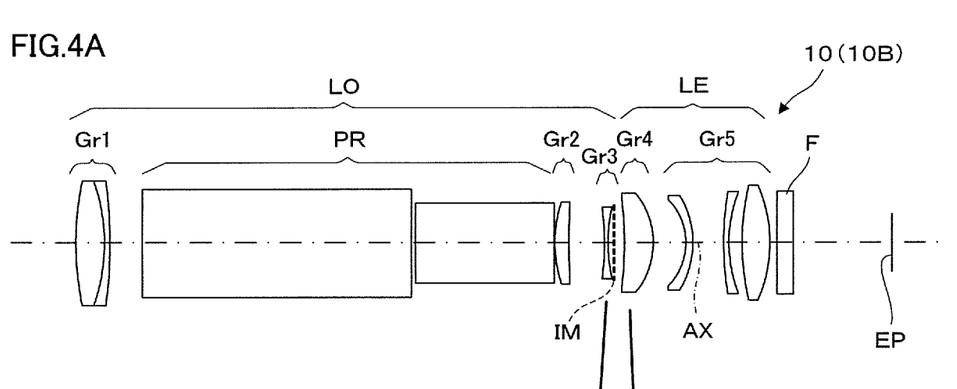
FIG. 4A is a sectional view illustrating an observation optical system of Example 2 at the time of low magnification.
Figure 4B:
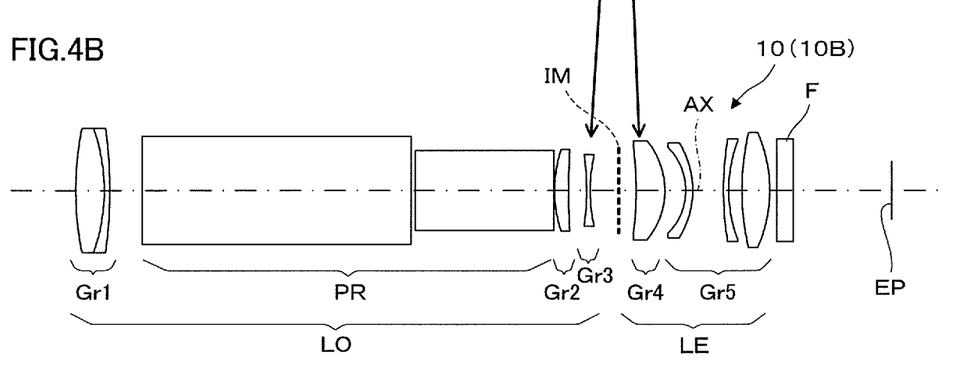
FIG. 4B is a sectional view illustrating the observation optical system of Example 2 at the time of high magnification.

FIG. 4A is a sectional view of an observation optical system 10B of Example 2 at the time of low magnification, and FIG. 4B is a sectional view of the observation optical system 10B at the time of high magnification. The observation optical system 10B of Example 2 has the objective system LO and the eyepiece system LE. The objective system LO includes, in the order from the object side, the first group Gr1 having a positive power, the inverting optical system PR, the second group Gr2 having a positive power, and the third group Gr3 having a negative power. The eyepiece system LE includes, in the order from the object side, the fourth group Gr4 having a positive power and the fifth group Gr5 including three lenses and having a positive power. The lenses included in the first to fifth groups Gr1 to Gr5 are made of glass. The third group Gr3 and the fourth group Gr4 move in a direction separating from each other along the optical axis AX to thereby achieve variation power from a low magnification to a high magnification.

Figure 5A:
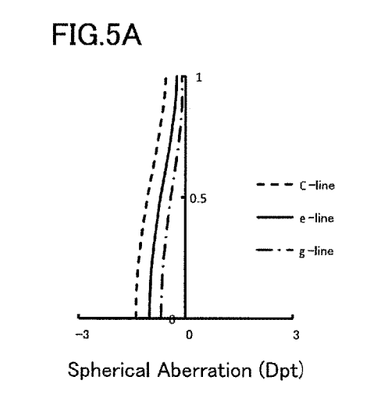
FIGS. 5A to 5C are aberration diagrams of the observation optical system of FIG. 4A, and FIGS. 5D to 5F are aberration diagrams of the observation optical system of FIG. 4B.
Figure 5B:
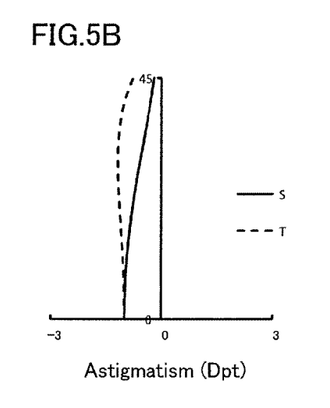
Figure 5C:
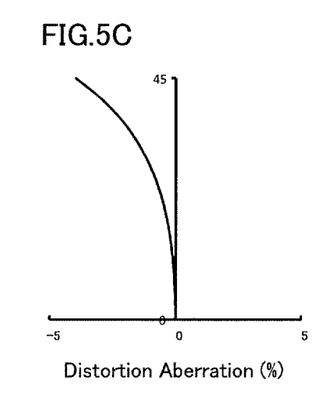
Figure 5D:
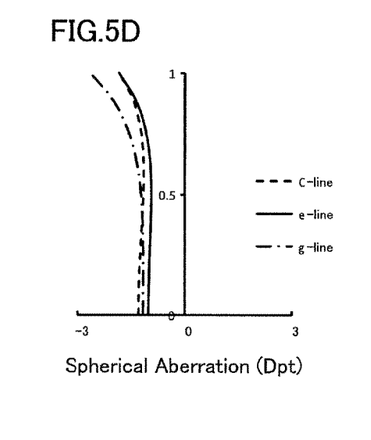
Figure 5E:
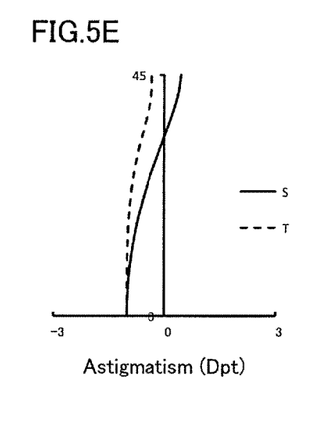
Figure 5F:
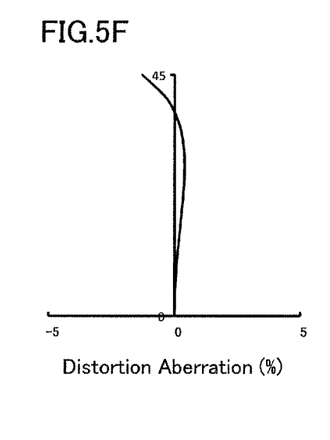

FIGS. 5A to 5C respectively illustrate spherical aberration, astigmatism, and distortion aberration relating to a virtual image observed via the observation optical system 10B at the time of low magnification as illustrated in FIG. 4A. FIGS. 5D to 5F respectively illustrates spherical aberration, astigmatism, and distortion aberration relating to a virtual image observed via the observation optical system 10B at the time of high magnification as illustrated in FIG. 4B.

Example 3

Optical data values of the observation optical system of Example 3 are listed in Table 7 below.

TABLE 7

| | low magnification | high magnification |
|---|---|---|
| magnification | 2.5 | 3.4 |
| diopter (dpt) | −1.0 | −1.0 |
| object distance (mm) | 387.9 | 387.9 |
| field of vision range (mm) | φ 90 | φ 80 |
| pupil diameter H (mm) | 5.3 | 4.0 |

Data of lens surface or the like of the observation optical system of Example 3 are listed in Table 8 below,

TABLE 8

| Surf. N | R (mm) | D (mm) | Nd | vd |
|---|---|---|---|---|
| 1 | 31.454 | 3.22 | 1.58913 | 61.25 |
| 2 | −17.413 | 0.64 | 1.80610 | 33.27 |
| 3 | −40.687 | 3.93 | | |
| 4 | INF | 32.471 | 1.72825 | 28.32 |
| 5 | INF | 0.50 | | |
| 6 | INF | 16.83 | 1.72825 | 28.32 |
| 7 | INF | 0.10 | | |
| 8 | 14.103 | 1.70 | 1.90366 | 31.32 |
| 9 | 3585.921 | d9 (variable) | | |
| 10 | −16.777 | 0.42 | 1.77250 | 49.62 |
| 11 | 14.301 | d11 (variable) | | |
| 12 (IM) | INF | d12 (variable) | | |
| 13 | −30.000 | 3.50 | 1.84666 | 23.78 |
| 14 | −7.259 | d14 (variable) | | |
| 15 | −6.173 | 0.85 | 1.71736 | 29.50 |
| 16 | −9.711 | 3.72 | | |
| 17 | 23.201 | 0.65 | 1.59270 | 35.44 |
| 18 | 13.108 | 2.22 | | |
| 19 | 30.271 | 3.80 | 1.77250 | 49.62 |
| 20 | −14.448 | 1.34 | | |
| 21 | INF | 2.00 | 1.5168 | 64.2 |
| 22 | INF | 12.00 | | |
| 23 (EP) | | | | |

Table 9 below provides an operative example of variable surface intervals d9, d11, d12, and d14 of Table 8, indicating the positions of the third group and the fourth group at the time of low magnification and at the time of high magnification in the observation optical system.

TABLE 9

| | low magnification | high magnification |
|---|---|---|
| d9 | 3.676 | 2.041 |
| d11 | 0.745 | 3.334 |
| d12 | 1.255 | 1.653 |
| d14 | 3.416 | 2.155 |

Figure 6A:
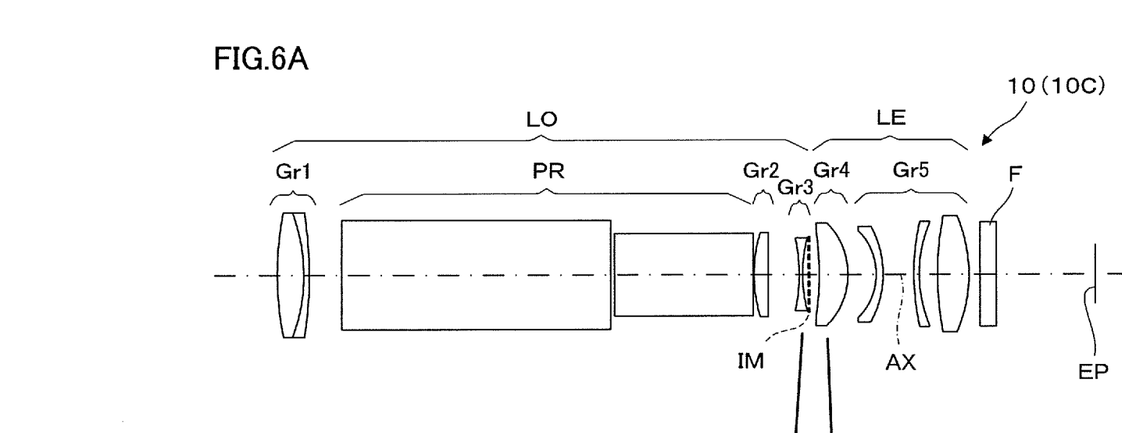
FIG. 6A is a sectional view illustrating an observation optical system of Example 3 at the time of low magnification.
Figure 6B:
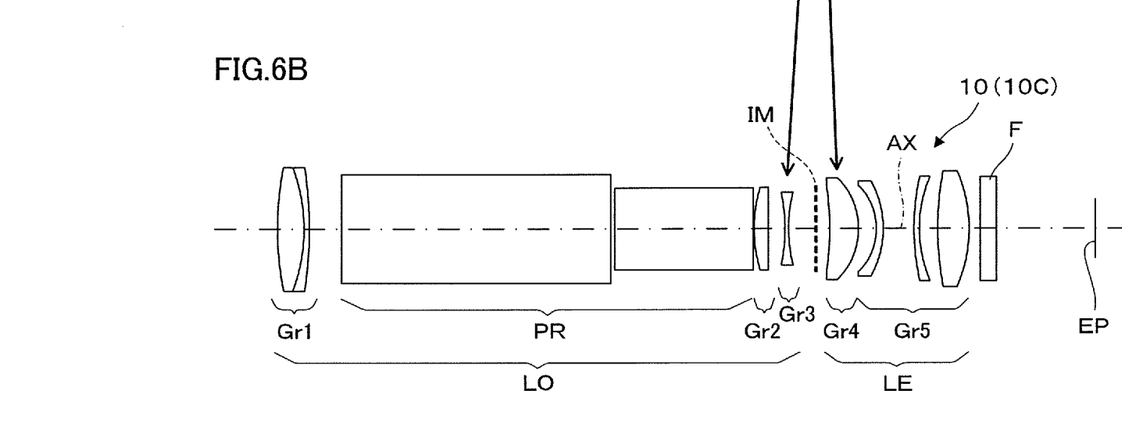
FIG. 6B is a sectional view illustrating the observation optical system of Example 3 at the time of high magnification.

FIG. 6A is a sectional view of an observation optical system 10C of Example 3 at the time of low magnification, and FIG. 6B is a sectional view of the observation optical system 10C at the time of high magnification. The observation optical system 10C of Example 3 has the objective system LO and the eyepiece system LE. The objective system LO includes, in the order from the object side, the first group Gr1 having a positive power, the inverting optical system PR, the second group Gr2 having a positive power, and the third group Gr3 having a negative power. The eyepiece system LE includes, in the order from the object side, the fourth group Gr4 having a positive power and the fifth group Gr5 including three lenses and having a positive power. The lenses included in the first to fifth groups Gr1 to Gr5 are made of glass. The third group Gr3 and the fourth group Gr4 move in a direction separating from each other along the optical axis AX to thereby achieve variation power from a low magnification to a high magnification.

Figure 7A:
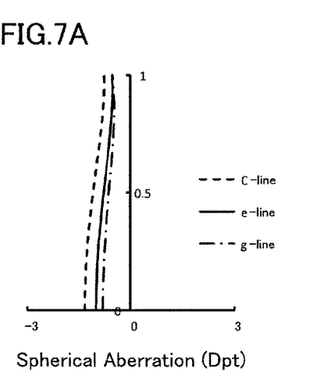
FIGS. 7A to 7C are aberration diagrams of the observation optical system of FIG. 6A, and FIGS. 7D to 7F are aberration diagrams of the observation optical system of FIG. 6B.
Figure 7B:
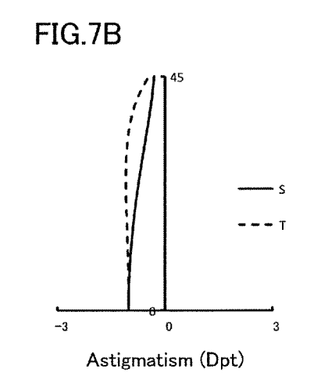
Figure 7C:
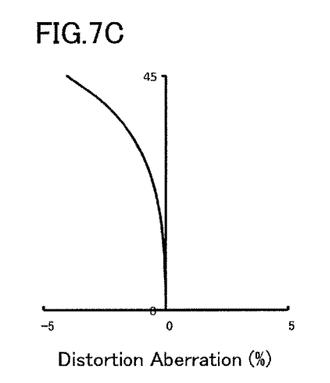
Figure 7D:
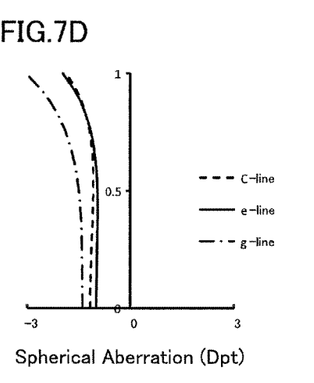
Figure 7E:
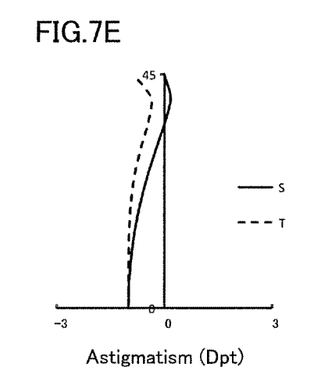
Figure 7F:
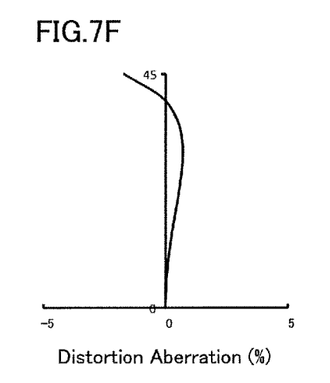

FIGS. 7A to 7C respectively illustrate spherical aberration, astigmatism, and distortion aberration relating to a virtual image observed via the observation optical system 10C at the time of low magnification as illustrated in FIG. 6A. FIGS. 7D to 7F respectively illustrate spherical aberration, astigmatism, and distortion aberration relating to a virtual image observed via the observation optical system 10C at the time of high magnification as illustrated in FIG. 6B.

Example 4

Optical data values of the observation optical system of Example 4 are listed in Table 10 below.

TABLE 10

|  | low magnification | high magnification |
|---|---|---|
| magnification | 2.5 | 3.4 |
| diopter (dpt) | −1.0 | −1.0 |
| object distance (mm) | 387.9 | 387.9 |
| field of vision range (mm) | φ 90 | φ 80 |
| pupil diameter H (mm) | 5.4 | 4.0 |

Data of lens surface or the like of the observation optical system of Example 4 are listed in Table 11 below.

TABLE 11

| Surf. N | R (mm) | D (mm) | Nd | vd |
|---|---|---|---|---|
| 1 | 27.636 | 3.38 | 1.58913 | 61.25 |
| 2 | −19.989 | 0.67 | 1.80610 | 33.27 |
| 3 | −58.081 | 3.50 | | |
| 4 | INF | 32.471 | 1.72825 | 28.32 |
| 5 | INF | 0.50 | | |
| 6 | INF | 16.83 | 1.72825 | 28.32 |
| 7 | INF | 0.10 | | |
| 8 | 12.873 | 1.34 | 1.80610 | 40.73 |
| 9 | 221.848 | d9 (variable) | | |
| 10 | −11.513 | 0.42 | 1.51680 | 64.2 |
| 11 | 8.936 | d11 (variable) | | |
| 12 (IM) | INF | d12 (variable) | | |
| 13 | −438.331 | 3.50 | 1.84666 | 23.78 |
| 14 | −8.102 | d14 (variable) | | |
| 15 | −6.400 | 0.85 | 1.80518 | 25.46 |
| 16 | −9.368 | 3.74 | | |
| 17 | 22.263 | 0.60 | 1.69895 | 30.05 |
| 18 | 13.046 | 2.10 | | |
| 19 | 25.413 | 3.72 | 1.77250 | 49.62 |
| 20 | −15.119 | 0.50 | | |
| 21 | INF | 2.00 | 1.5168 | 64.2 |
| 22 | INF | 12.00 | | |
| 23 (EP) | | | | |

Table 12 below provides an operative example of variable surface intervals d9, d11, d12, and d14 of Table 11, indicating the positions of the third group and the fourth group at the time of low magnification and at the time of high magnification in the observation optical system.

TABLE 12

|  | low magnification | high magnification |
|---|---|---|
| d9 | 5.253 | 3.604 |
| d11 | 0.720 | 1.330 |
| d12 | 1.330 | 3.581 |
| d14 | 3.534 | 2.322 |

Figure 8A:
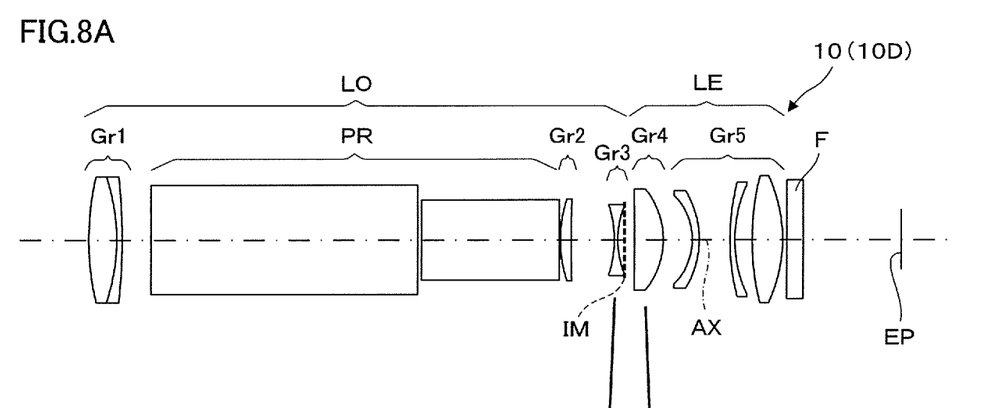
FIG. 8A is a sectional view illustrating an observation optical system of Example 4 at the time of low magnification.
Figure 8B:
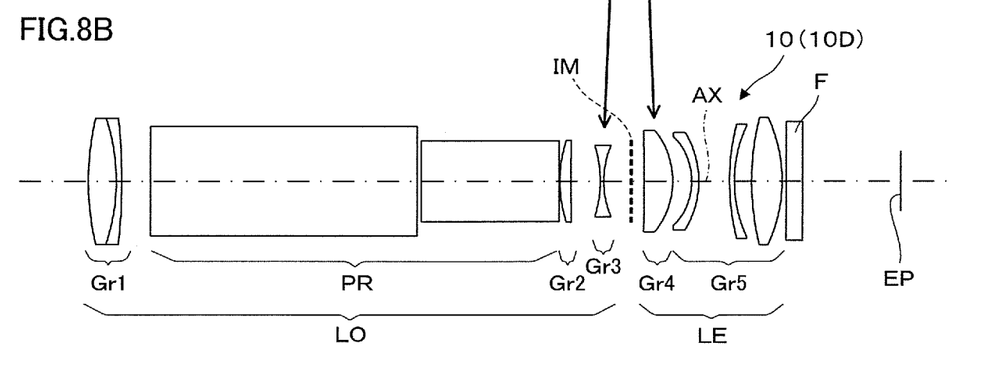
FIG. 8B is a sectional view illustrating an observation optical system of Example 4 at the time of high magnification.

FIG. 8A is a sectional view of an observation optical system 10D of Example 4 at the time of low magnification, and FIG. 8B is a sectional view of the observation optical system 10D at the time of high magnification. The observation optical system 10D of Example 4 has the objective system LO and the eyepiece system LE. The objective system LO includes, in the order from the object side, the first group Gr1 having a positive power, the inverting optical system PR, the second group Gr2 having a positive power, and the third group Gr3 having a negative power. The eyepiece system LE includes, in the order from the object side, the fourth group Gr4 having a positive power and the fifth group Gr5 including three lenses and having a positive power. The lenses included in the first to fifth groups Gr1 to Gr5 are made of glass. The third group Gr3 and the fourth group Gr4 move in a direction separating from each other along the optical axis AX to thereby achieve variation power from a low magnification to a high magnification.

Figure 9A:
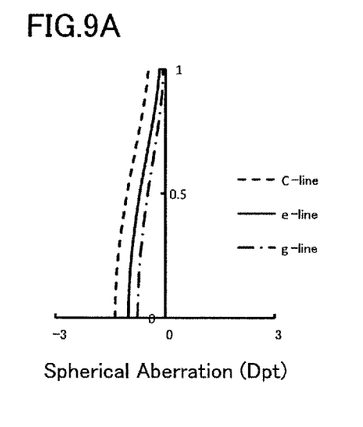
FIGS. 9A to 9C are aberration diagrams of the observation optical system of FIG. 8A, and FIGS. 9D to 9F are aberration diagrams of the observation optical system of FIG. 8B.
Figure 9B:
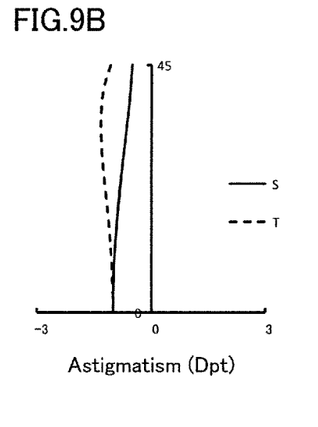
Figure 9C:
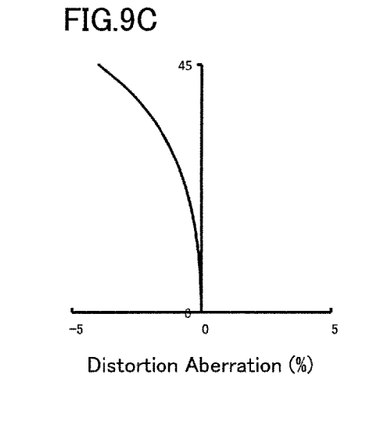
Figure 9D:
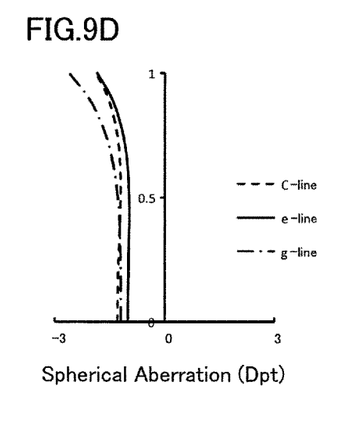
Figure 9E:
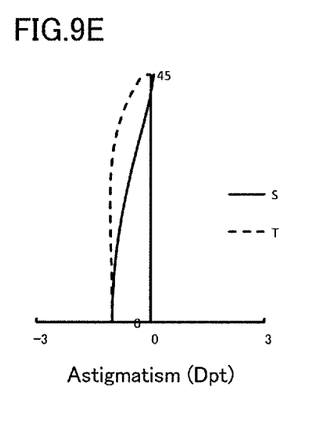
Figure 9F:
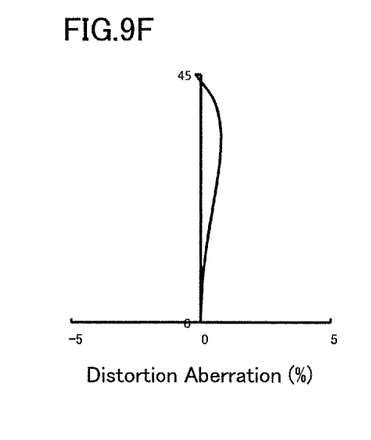

FIGS. 9A to 9C respectively illustrate spherical aberration, astigmatism, and distortion aberration relating to a virtual image observed via the observation optical system 10D at the time of low magnification as illustrated in FIG. 8A. FIGS. 9D to 9F respectively illustrate spherical aberration, astigmatism, and distortion aberration relating to a virtual image observed via the observation optical system 10D at the time of high magnification as illustrated in FIG. 8B.

Table 13 below has summarized therein values of respective Examples 1 to 4 corresponding to respective conditional expressions (1) to (3). for reference. Note that, in the fields for the conditional expression (1) in Table 13, the upper row indicates values for a case where the value L is the distance between the optical surface S1 of the third group Gr3 and the real image surface IM along the optical axis AX, and the lower row indicates values for a case where the value L is the distance between the real image surface IM and the optical surface S2 of the fourth group Gr4 along the optical axis AX.

TABLE 13

|  |  | example 1 | example 2 | example 3 | example 4 |
|---|---|---|---|---|---|
| conditional expression (1) | between third group and real image surface | 0.32 | 0.29 | 0.29 | 0.30 |
|  | between real image surface and fourth group | 0.52 | 0.50 | 0.50 | 0.55 |
| conditional expression (2) |  | 4.3 | 4.1 | 4.2 | 4.2 |
| conditional expression (3) |  | 5.8 | 5.3 | 4.5 | 5.3 |

Although observation optical systems according to one or more embodiments have been described above, the observation optical system according to one or more embodiments of the present invention is not limited to those described above. For example, the aforementioned embodiments may have a cover member having light permeability provided outside of the lens located closest to the object side and the lens located closest to the pupil side in the observation optical system 10, in consideration of scratch resistance, chemical resistance, or the like.

In the objective system LO, there may be provided a lens or the like which essentially lacks power, in addition to the first group Gr1, the second group Gr2, and the third group Gr3. Additionally, in the eyepiece system LE, there may be provided a lens or the like which essentially lacks power, in addition to the fourth group Gr4 and the fifth group Gr5.

Each of the lenses included in the first to fifth groups Gr1 to Gr5 may be an aspherical lens, and the lenses except the lens located closes to the object side and the lens located closest to the pupil side, for example, may be made of resin.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A real-image type observation optical system comprising:
    an objective system comprising an inverting optical system that inverts an inverted image to an erect image; and
    an eyepiece system provided for observing the erect image formed by the objective system, wherein
    the objective system further comprises, in the order from an object side, a first group having a first positive power, a second group having a second positive power, and a third group having a negative power,
    the eyepiece system comprises, in the order from the object side, a fourth group having a fourth positive power and a fifth group having a fifth positive power,
    the inverting optical system is located between the first group and the second group,
    the third group and the fourth group move in directions separating from each other along an optical axis to thereby perform variable power from a low magnification to a high magnification, and
    the following conditional expression is satisfied:

$$0.28 < H \times L/f \leq 0.55 \quad (1)$$

where,
    H is a pupil diameter at a time of low magnification,
    L is a distance along the optical axis between a real image surface and an optical surface of the third group and a distance along the optical axis between a real image surface and an optical surface of the fourth group facing the real image surface at the time of low magnification, and
    f is a focal distance of the eyepiece system at the time of low magnification.

2. The observation optical system according to claim 1, wherein the following conditional expression is satisfied:

$$L/f^2 \times 1000 > 4 \quad (2).$$

3. The observation optical system according to claim 1, wherein a negative meniscus lens of the fifth group located closest to the object side satisfies the following conditional expression:

$$4.4 < (R1b + R1a)/(R1b - R1a) < 6.0 \quad (3)$$

where,
    R1a is an object-side curvature radius of a lens of the fifth group located closest to the object side, and
    R1b is a pupil-side curvature radius of a lens of the fifth group located closest to the object side.

4. The observation optical system according to claim 1, wherein the first group is moved alone, or the inverting optical system and the second group are moved integrally, along the optical axis, so as to correct a diopter difference between at the time of low magnification and at a time of high magnification.

5. The observation optical system according to claim 1, wherein each of the third group and the fourth group includes a single lens.

* * * * *